United States Patent [19]

Stephany et al.

[11] Patent Number: 5,682,184
[45] Date of Patent: Oct. 28, 1997

[54] SYSTEM FOR SENSING INK LEVEL AND TYPE OF INK FOR AN INK JET PRINTER

[75] Inventors: Joseph F. Stephany, Williamson; Gary A. Kneezel, Webster; John H. Slowik, Penfield, all of N.Y.

[73] Assignee: Xerox Corporation, Stamford, Conn.

[21] Appl. No.: 574,089

[22] Filed: Dec. 18, 1995

[51] Int. Cl.⁶ .................... B41J 2/195; G01F 23/00
[52] U.S. Cl. .......................... 347/7; 73/304 C
[58] Field of Search ................ 347/7, 85, 86, 347/87, 19; 73/304 C; 141/95

[56] References Cited

U.S. PATENT DOCUMENTS

| Re. 32,572 | 1/1988 | Hawkins et al. | 156/626 |
|---|---|---|---|
| 4,342,042 | 7/1982 | Cruz-Uribe et al. | 347/7 |
| 4,415,886 | 11/1983 | Kyogoku et al. | 340/618 |
| 4,571,599 | 2/1986 | Rezanka | 347/87 |
| 4,639,738 | 1/1987 | Young et al. | 347/89 |
| 4,700,754 | 10/1987 | Kringe | 141/95 |
| 5,079,570 | 1/1992 | Mohr et al. | 347/7 |
| 5,136,305 | 8/1992 | Ims | 347/7 |
| 5,221,397 | 6/1993 | Nystrom | 156/273.5 |
| 5,289,211 | 2/1994 | Morandotti et al. | 347/7 |
| 5,386,224 | 1/1995 | Deur et al. | 347/7 |
| 5,406,843 | 4/1995 | Hannan et al. | 73/304 C |
| 5,414,452 | 5/1995 | Accatino et al. | 347/7 |
| 5,434,603 | 7/1995 | Hunt | 347/7 |
| 5,437,184 | 8/1995 | Shillady | 73/304 C |

*Primary Examiner*—Benjamin R. Fuller
*Assistant Examiner*—Craig A. Hallacher

[57] ABSTRACT

A capacitor is created in an ink tank supplying ink to an ink jet printhead by placing parallel capacitive plates on sides of the tank with the ink therebetween acting as the capacitor dielectric. An electrical AC potential is applied across the capacitor. Changes in current flow through the plates are detected in a phase sensitive bridge circuit and digital signals are generated and sent to a processor for conversion into low ink level signals. The output signal is also used to identify a particular type of ink by either comparing points on a characteristic curve of the ink volume verses capacitance or, in a second embodiment, by periodically sweeping an applied oscillator voltage over a selected frequency range and comparing measured electrical resonance parameters for the ink tank capacitor with stored information about resonance parameters for different types of ink.

7 Claims, 4 Drawing Sheets

SYSTEM FOR SENSING INK LEVEL AND TYPE OF INK FOR AN INK JET PRINTER

BACKGROUND AND MATERIAL DISCLOSURE STATEMENT

The present invention relates to ink jet printers and, more particularly, to an ink level sensing system that detects characteristics of an ink supply system such as the level of ink in a supply container and the particular type of ink being used.

Ink jet printers eject ink onto a print medium such as paper in a controlled pattern of closely spaced dots. Black or color images may be formed. To form color images, multiple ink jet printheads may be used, with each head being supplied with ink of a different color from an associated ink cartridge.

Thermal ink jet printing systems use thermal energy selectively produced by resistors located in capillary filled ink channels near channel terminating nozzles or orifices to vaporize momentarily the ink and form bubbles on demand. Each temporary bubble expels an ink droplet and propels it toward the recording medium. The printing system may be incorporated in either a carriage type printer or a pagewidth type printer. A carriage type printer typically has a relatively small printhead containing the ink channels and nozzles. The printhead is usually sealingly attached to an ink supply cartridge and the combined printhead and cartridge assembly is reciprocated along a scan path to print one swath of information at a time on a stationarily held recording medium, such as paper. After the swath is printed, the paper is stepped a distance equal to the height of the printed swath, so that the next printed swath will be contiguous therewith. The procedure is repeated until the entire page is printed. In contrast, a pagewidth printer has a stationary printhead having a length equal to or greater than the width of the recording medium. The paper is continually moved past the pagewidth printhead in a direction normal to the printhead length at a substantially constant speed during the printing process. Moving carriage type ink jet printers must either carry the ink reservoir along with the printhead or provide a flexible ink supply line between the moving printhead and a stationary ink reservoir. Pagewidth printers have an ink supply cartridge located outside the print zone and connected to the printbar ink distribution system, for example a manifold which is connected to the various ink inlets on the thermal ink jet die modules composing the printbar.

Wide format carriage type thermal ink jet printers, such as plotters, use a relatively large amount of ink per print. In order to minimize the number of times that an emptied ink supply must be changed, it is preferable to have ink supplies containing large amounts of ink (on the order of 0.1 to 1 liter or more per color). In such applications of the moving carriage type, it is advantageous to use a relatively large stationary ink reservoir and a flexible supply line arrangement to a movable small ink reservoir that is attached to the moving printhead. This is because the carriage providing the printhead motion is subjected to periodic accelerations at the ends of scan. Therefore, a large carriage mounted ink reservoir would require a large drive motor along with robust structure in order to achieve rapid carriage accelerations and accurate control of the printhead position. Small carriage mounted disposable ink reservoirs suffer the disadvantage of requiring frequent replacement. Such disposable ink reservoirs are sometimes bundled with the ink jet printhead so that both are discarded when the cartridge is empty.

For either a partial width printhead on a moving carriage or a pagewidth printer, it is desirable to have a low ink level warning to alert a user to replace or refill the ink supply cartridge so that the ink does not run out during a print job. Presently, for some applications (such as ink jet plotting), some users choose to install new print cartridges prior to starting an extensive printing job because it is less costly to replace a questionable cartridge rather than have one or more colors lost in the output prints.

Various prior art methods and devices are known for detecting reduced or low levels of ink in an ink supply container. U.S. Pat. No. 4,342,042 discloses an ink sensing system which includes output from an LED sensor reflected from a flexible membrane which serves as the upper surface of an ink supply reservoir. The membrane contracts as the ink level is depleted, and the LED sensor detects the contraction and generates a low ink level signal.

U.S. Pat. No. 5,079,570 provides a method for detecting ink levels in an ink cartridge where the ink is supplied from a foam reservoir. A binary fluidic indicator is fluidly coupled with the foam reservoir and is triggered when the fluid level in the foam reaches a certain prescribed level.

U.S. Pat. No. 5,289,211 discloses a low ink detecting system which includes a pair of electrodes immersed in the ink impregnated foam reservoir. The electrodes are connected to a bridge circuit which measures the electrical resistance of the ink between the two electrodes.

U.S. Pat. No. 5,414,452 uses a logic circuit which counts the number of drops expelled and compares the instant number with the maximum number of drops equivalent to a known value of ink in the ink reservoir.

U.S. Pat. No. 5,434,603 discloses a visual indicator system where sidewalls of the reservoir retreat inwardly during ink depletion changing the orientation of indicator stripes and modifying the color visible to an observer through a window.

U.S. Pat. No. 5,386,224 places a level sensing probe into the ink supply and senses electrical conductivity changes of the ink.

U.S. Pat. No. 5,136,305 discloses a low ink detecting system wherein a thermistor is placed in the ink supply and periodically energized. The temperature rise of the ink is measured and compared with preestablished values to determine the ink depletion state of the reservoir.

U.S. Pat. No. 4,639,738 discloses a detection system which incorporates detection ports in the cartridge for detecting pressure conditions in the top and bottom of the cartridge. The ports are coupled to a pressure differential sensor that signals a refill condition.

Co-pending U.S. application Ser. No. ___(D/95186) discloses a low ink level system which senses resistive changes in a strain gage, the resistive changes proportional to the weight of the ink in the ink container. Output signals are generated in a circuit incorporating the strain gage. Output signals from the circuit are used to provide a low ink, or out of ink warning, to a user.

As seen, some of the prior art references disclose methods relying on measuring changes in electrical resistance of ink between electrodes. However, such methods require direct contact between the electrodes and the ink, which may have materials compatibility implications. A further problem with some of the prior art methods is that signals are produced only when the ink in the ink supply container is completely depleted. It would be desirable to provide a signal indicating a low ink level at some level prior to complete ink depletion so that a user can replace an ink cartridge before the ink has completely run out.

It would also be desirable to provide an ink level sensing system which would be coupled with an additional function of detecting the type of ink being used. Such a capability would enable the printer driver to preclude or warn against a printing operation which is using the wrong type of ink, e.g., a black ink printing using a cartridge with a colored ink, or an ink not designed for use in the installed type of printhead and which may give rise to printing performance or reliability problems.

SUMMARY OF THE INVENTION

In a preferred embodiment of the invention, there is provided a system for detecting low levels of ink in an ink supply tank supplying ink to an associated printhead by creating a capacitor with the ink constituting the dielectric media between two parallel capacitor plates located on the interior or exterior walls of the tank. A circuit is connected to the capacitor which generates an AC voltage across it. The AC current which flows through the circuit is separated into in-phase and 90° out-of-phase components. These components are proportional to the capacitance and inversely proportional to the resistance, respectively, of the ink in the tank. Capacitance decreases and resistance increases as the ink level in the tank decreases. Capacitance and resistance may be measured in the external circuit. A predetermined value of capacitance can be selected to generate a low ink level signal. In addition, taking the ratio of the out-of-phase and the in-phase components gives a signature of the type of ink between the plates. This ratio is equal to the ratio of the electrical leakage to the dielectric constant, which is a unique number for each type of ink.

In an alternative embodiment, the AC source is a voltage controlled oscillator having a predetermined frequency range. The same circuitry is used as for the first embodiment, but instead of a constant AC voltage across the capacitor, an embedded processor in the printer controls the oscillator such that it sweeps over a predetermined frequency range. The phase detected outputs would then be proportional to the reactance and dissipation of the ink. Ink level is determined as before, but ink identity is determined by the frequency at which resonance occurs. A resonance peak plot is obtained by plotting capacitance versus frequency. This is called the Maxwell-Wagner effect. The resultant plot differs for different types of ink and a conversion is made between changes in resonant frequency and specific type characteristics which have been stored in computer memory.

The present invention relates, generally, to a system for detecting a predetermined characteristic of an ink contained within an ink supply tank supplying ink to a printhead, comprising, in combination:

a capacitor, including capacitor plates positioned on both sides of ink in said ink supply tank, the ink forming the dielectric material which partially or completely fills the gap of the capacitor, a source of electrical potential applied across said capacitor plates and circuit means connected to said capacitor, said circuit means generating an output signal representative of said predetermined characteristic of said ink.

More specifically, the invention is drawn to a system for detecting the level of an ink contained within an ink supply tank supplying ink to a printhead, comprising in combination:

a capacitor, including capacitor plates positioned on both sides of ink in said ink supply tank, the ink forming the dielectric material which partially or completely fills the gap of the capacitor, an AC voltage source applied across said capacitor plates and circuit means connected to said capacitor, said circuit means generating an output signal representative of said predetermined characteristic of said ink, said circuit means including resistive means connected between said capacitor and ground, said resistive means having a voltage across said means proportional to the current which charges the capacitor plate and having components both in-phase and 90° out-of-phase with said AC voltage source, said voltage across said means varying as a function of the level of ink in said tank, phase detecting means for receiving as inputs; a signal derived from said applied AC voltage signal and the output of said resistor, and for generating as outputs DC voltages proportional to the amplitude of the current in-phase with the applied voltage and a quadrature DC voltage proportional to the amplitude of the current 90° out of phase with the applied voltage, A/D conversion means for converting the output of said phase detecting means into a digital signal representing the instant level of ink in said tank and means for converting said digital signal into a low ink level indication.

The invention also includes a method for detecting the volume of ink in an ink tank comprising the steps of:

forming a capacitor by positioning plates on opposite sides of said ink, the ink forming a dielectric therebetween, applying an AC voltage across said capacitor, connecting a resistive load in series with said capacitor, generating a first output voltage signal proportional to the amplitude of the current in-phase with the applied AC voltage.

generating a second output voltage proportional to the amplitude of the current 90 degrees out-of-phase with the applied voltage, converting the two voltages into a digital output, comparing the digital output to predetermined reference levels stored in a system processor, said reference levels providing points on a curve representing ink volume relative to ink electrical capacitance and generating a low ink level signal when a particular point on said curve is identified.

DESCRIPTION OF THE INVENTION

Figure 1:
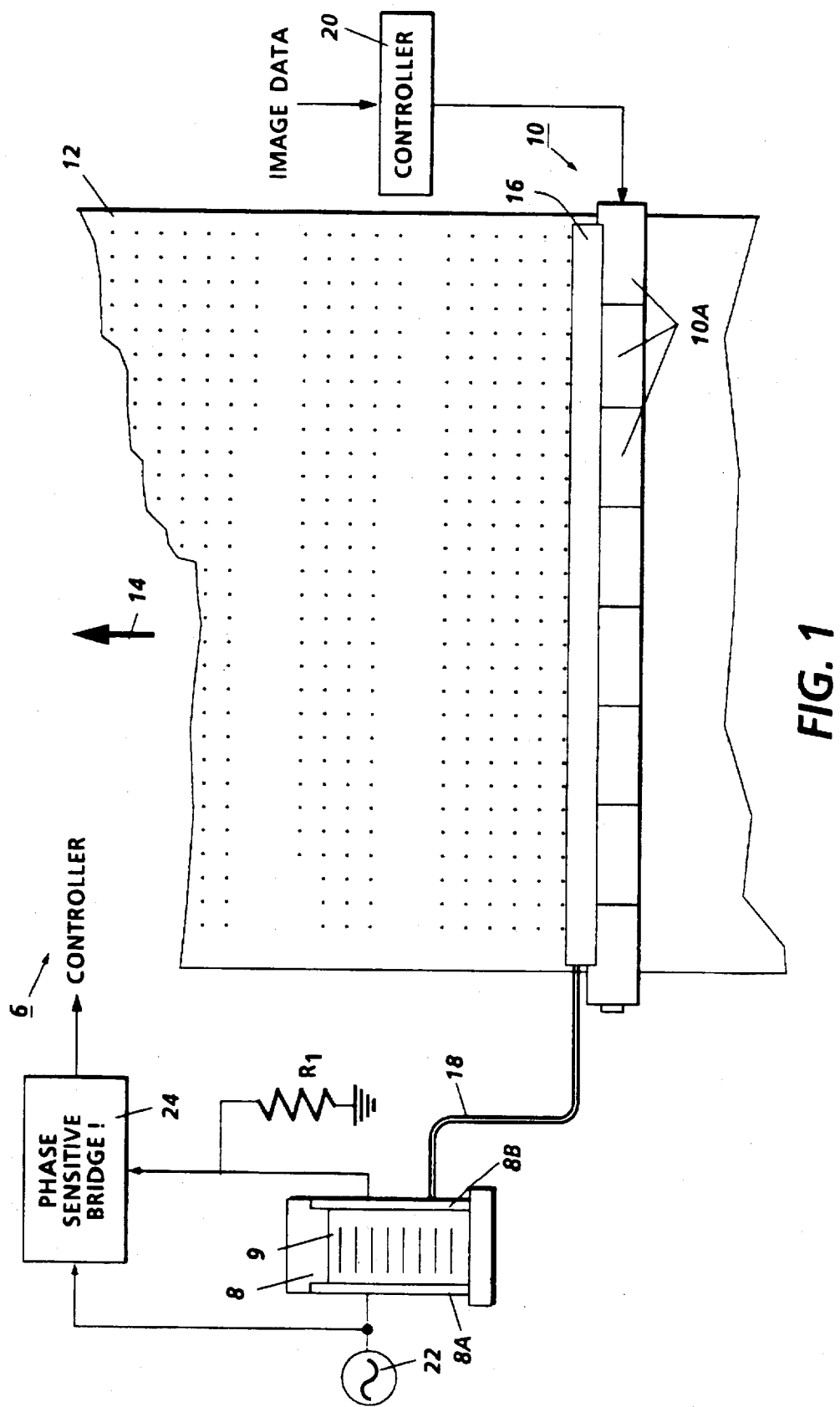
FIG. 1 shows the ink level sensing system of the present invention incorporated into a pagewidth ink jet printer.

FIG. 1 shows a pagewidth (full width) ink jet printing system which is supplied with ink from an ink tank 8 whose ink level is monitored by an ink level sensing system according to the invention. The ink level sensing system is applicable to full color pagewidth printers as well as other types of printers including scanning type systems where partial width printheads are mounted on a scanning carriage which is then moved through a print zone and the printhead supplied with ink from a tank or cartridge is either integrally mounted on the carriage or connected via tubing from a remote location.

Referring to FIG. 1, a full width black printhead 10 is positioned to write on a recording medium 12 which is indexed and moves in the direction of arrow 14. Printhead 10 has been assembled from a plurality of modules 10A which have been butted together to form a 12" array according to the techniques described in U.S. Pat. No. 5,221,397, whose contents are hereby incorporated by reference. Printhead 10, in this embodiment, provides 7,200 nozzles or jets. As described in the '397 patent, the printhead modules 10A are formed by precisely bonding together a channel array, containing arrays of recesses that are used as sets of channels and associated ink reservoirs, and a heater wafer containing heater elements and addressing circuitry. The bonded wafers are diced to form the printhead resulting in formation of the jets, each nozzle or jet associated with a channel with a heater therein. The heaters are selectively energized to heat the ink and expel an ink droplet from the associated jet. The ink channels are fluidically connected into a common ink manifold 16 mounted on the side of printhead 10 and in sealed communication with the ink inlets of the channel arrays through aligned openings. The manifold 16 is supplied with the appropriate ink, black for this embodiment, from ink cartridge 8 via flexible tubing 18. Cartridge 8, originally filled with ink 9, has two capacitive plates 8A, 8B attached to the inside walls of the cartridge. The capacitive plates are preferably made of metal, and in the case where the plates directly contact the ink, the metal should be chosen to resist chemical attack by the ink, or the metal surface should be passivated, for example by a thin plastic layer.

Image data signals are applied to printhead 10 via controller 20. Controller 20 supplies the driving data and control signals to the heat generating resistors formed in the channels of printhead 10. The signals are conventionally applied via wire bonds (not shown) to driver circuitry and logic on each module 10A. Controller 20 may take the form of a microcomputer including a CPU, a ROM for storing complete programs, and a RAM. Controller 20 controls the feeding of the recording sheet 12 as well as other printer functions described below.

When a line recording operation is performed, each resistor associated with a jet in printhead 10 is driven selectively in accordance with the applied image data so that ink droplets are ejected from the associated jets forming a line of recording on the surface of the recording medium 12. With continued operation of the printhead, the level of ink 9 in tank 8 gradually drops. As the ink level drops, the measured capacitance of ink 9 decreases. According to a first embodiment of the invention, an AC voltage from AC source 22 is placed across plates 8A, 8B. Changes in current flow through the plates are detected in a phase sensitive bridge circuit 24 as referred to the applied voltage 22, and digital signals are generated and sent to a processor in controller 20 for conversion into low ink level output signals. These changes in capacitance are sensed and converted into electrical signals which correspond to predetermined low levels of operation requiring a low ink level warning signal to be generated.

Figure 2:
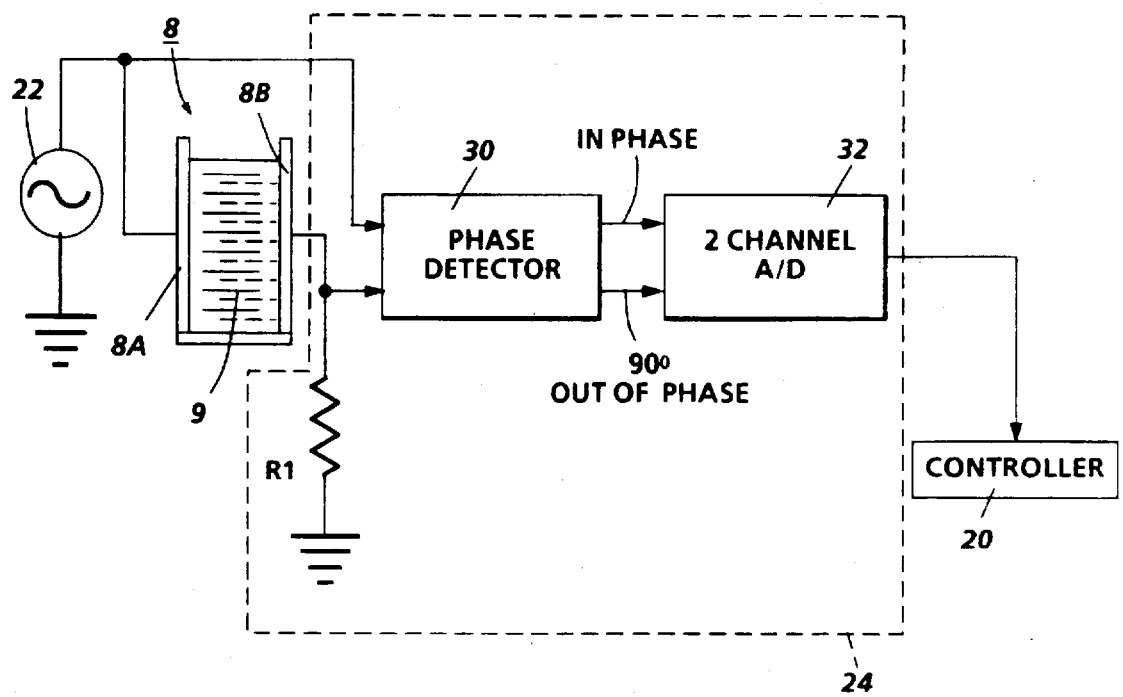
FIG. 2 shows circuitry associated with the ink tank of FIG. 1 and is used to derive a low level and/or type of ink signal.

FIG. 2 shows a circuit comprising AC source 22, a capacitor formed by plates 8A, 8B with ink 9 as the dielectric therebetween and a block diagram of a phase-sensitive bridge circuit 24. An AC voltage, typically on the order of 60 hz to 1 khz, is placed across plates 8A, 8B. A resistor R1 is connected between plate 8B and ground; voltage across resistor R1 is proportional to the current flowing through plates 8A, 8B and leads the voltage typically by less than 90°. Voltage across R1 forms one input to phase detector 30. The other input to detector 30 is derived from the AC voltage across plates 8A, 8B. The outputs of detector 30 are a DC voltage proportional to the amplitude of the current in-phase with the applied voltage and a DC voltage, called the quadrature component, which is proportional to the amplitude of the current 90° out of phase with the applied voltage. The in-phase and out-of-phase voltages are input to a two channel A/D converter 32 which generates a digital output sent to an embedded processor in controller 20. This digital output signal is proportional to the electrical capacitance of the capacitor as determined by the level of the ink 9 and thus can be compared to stored values in the processor corresponding to predetermined low ink levels. Upon reaching a low ink level, an appropriate low ink warning signal is generated by the controller and used to create a low ink display.

Figure 3:
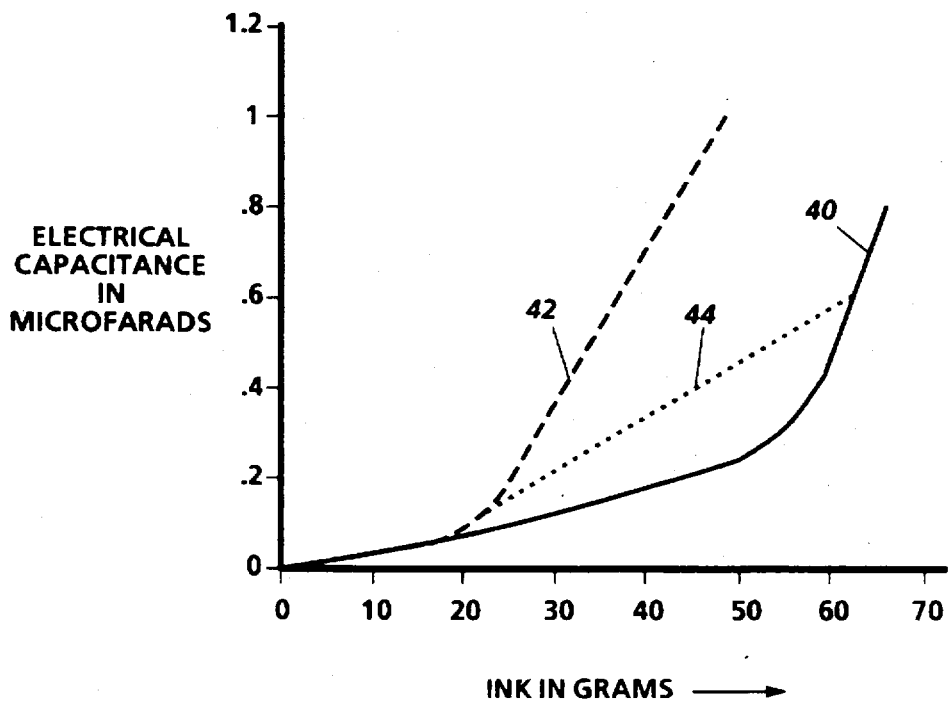
FIG. 3 shows plots of types of ink obtained by plotting volumes of ink and electrical capacitance of the ink.

As one example of this embodiment, a Xerox black ink cartridge for the 4004 printer was used as cartridge 8. The interior of cartridge 8 was filled with felt pads which were soaked with 64 grams of ink, the ink being the standard P2A black ink presently sold in the cartridge for the 4004 printer. Plates 8A, 8B were 2¼×2¼ inch aluminum plates, epoxy bonded to the internal walls of the cartridge. The electrical capacitance measured by a Sprague model T0-6 capacitance bridge was approximately 800 microfarads. FIG. 3 shows a plot of ink volume versus electrical capacitance for the P2A ink (solid line) 40 as well as plots 42, 44 for two other inks described later. A voltage of 60 hz from source 22 was applied to the plates. Plot 40 demonstrates that the measured electrical capacitance decreases in proportion to the reduction in the volume of ink. When the felt pads are completely dry, the measured capacitance is less than 100 picofarads. It is evident that one or more ink levels can be selected to represent a low ink signal; e.g. at 30 grams, repeated at 20 grams, and again at 10 grams. Reference levels corresponding to the predetermined ink levels are stored in the processor for later comparison.

Plots 42 and 44, shown in dashed and dotted form respectively, represent measurement of two other types of ink. Plot 42 is a HQFD black ink having the following characteristics (relatively fast drying and low viscosity). Plot 44 is a Charisma cyan ink having the following characteristics (cyan dye colorant). As can be seen in FIG. 3, the relationship between the ink volumes and measured electrical capacitance differs for the different inks. This enables a second feature of the invention; identification of the particular type of ink in cartridge 8 and comparison of the ink to the intended print function to ensure that ink of the proper character (density, color, etc.) is contained in the cartridge. For example, if a particular print mode requires use of the P2A black ink, a capacitor measurement at full ink loading should provide a first point on plot 40 of about 800 microfarads. If the reading is actually 600 microfarads, indicating a cyan ink presence, a warning indication can be activated and printing disabled until the proper ink tank (black) is inserted. As new inks are introduced into a printer, the appropriate reference information can be stored in the processor for future use. One approach is to electrically encode the information relating to an ink on the printhead through a separate contact on the cartridge that is connected to a ROM which is serially read.

A different approach (with reduced accuracy) for accommodating any new ink is to calibrate the sensor within the printer. The first time a new ink is used, the electrical capacitance could be measured and stored. Then after a given number of jet firings (determined by counting the printing data) it could be measured again and an extrapolation to the zero ink level made.

It has been found that the capacitance effects of the ink were so high that a correction for the capacitance of the unloaded cartridge is not necessary. This results in a robust measurement. Also, because of this high capacitance, there was negligible influence due to the capacitance of objects around the cartridge. The capacitance bridge used worked at 60 hz and gave the true capacitance between the plates since it only measured the quadrature component. The leakage or power factor was also measured and was always found to be very high, approaching 50%. Care needs to be taken in selecting a capacitance measuring system in this application. Some digital-type capacitance meters are known to give erroneous readings when high leakage currents are present. Therefore, use of phase-sensitive bridge circuit 24 gives just the true capacitance without leakage affecting the results by measuring only the quadrature component.

Taking the ratio between the quadrature component and the in-phase componet gives a signature of the type of ink between the plates also. This ratio is equal to the ratio of the specific leakage to the dielectric constant which is a unique number for each type of ink. This property is also useful in determining the type of ink being used. Furthermore, it is possible to design inks to incorporate additives which give a specific signature, rather than simply use the signature which is the byproduct of the ink components which have other functions for ink jet printing.

Figure 6:
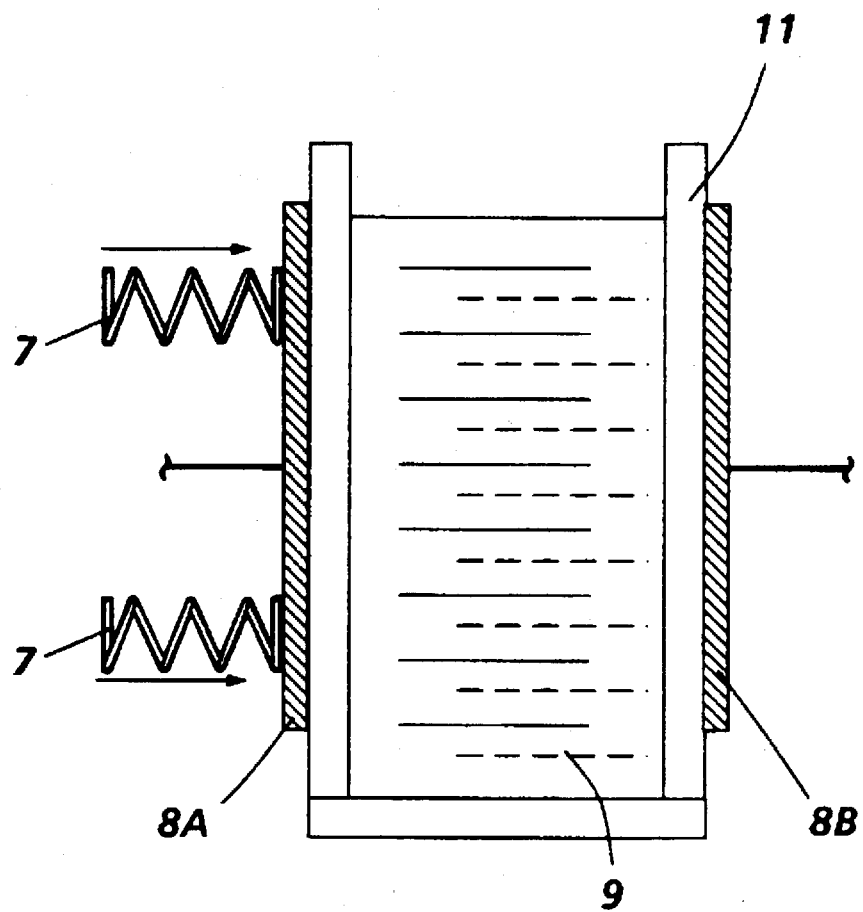
FIG. 6 is an alternate embodiment of the ink tank of FIG. 2 with the capacitor plates attached to the outside walls of the tank.

Other variations of this embodiment are possible. The plates may reside outside the cartridge, so that they are part of the printer and do not need to be replaced when the cartridge or ink supply is replaced, as shown in FIG. 6. In this example, the capacitor plates 8A, 8B may be spread apart in order to insert a new ink tank, and then compression springs 7 press plate 8A against the tank wall 11. Stationary plate 8B is held against the opposite wall. Details of the electrical measurement may also be varied. A higher frequency for measurements than the 60 hz used in the example may be advantageous. This would give a lower capacitive impedance and somewhat reduce the high power factor found in the measurements.

While the embodiment of FIG. 1 showed an ink level sensing system used in a pagewidth print system wherein the ink tank was located at a fixed position outside the print zone, the invention can also be used in a scanning type of system wherein one or more partial width array printheads are mounted on a scanning carriage with an ink tank mechanically integrated with the printhead. Disclosure concerning scanning systems are, for example, found in U.S. Pat. No. 4,571,599 and U.S. Pat. No. Reissue 32,572, the relevant portions of which are incorporated herein by reference.

Figure 4:
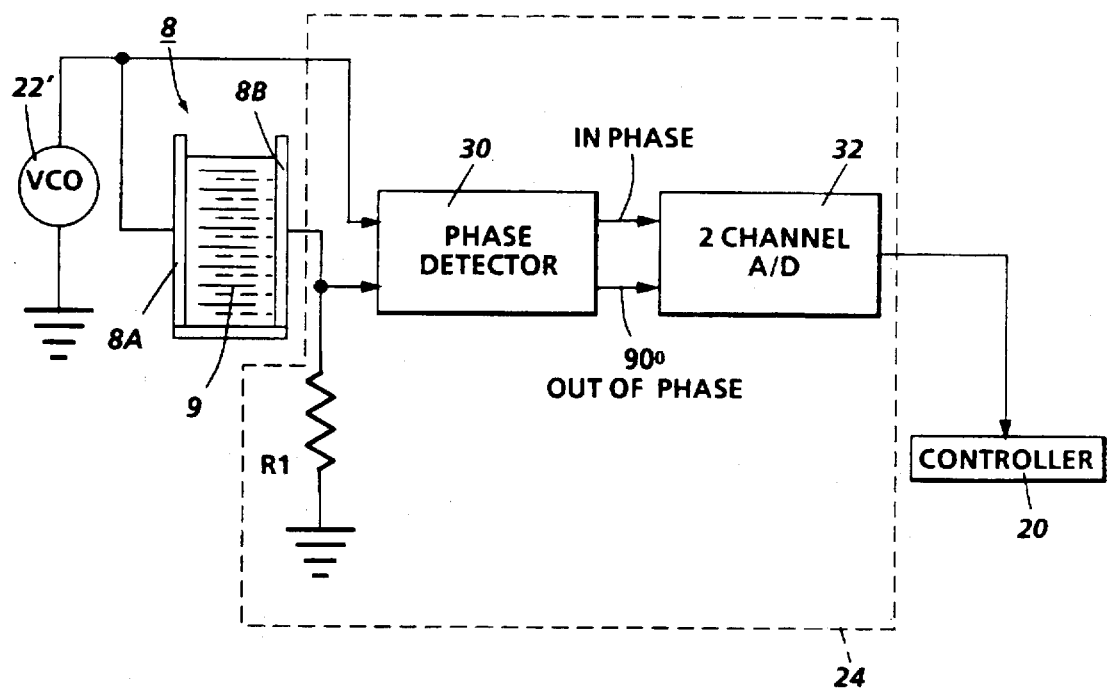
FIG. 4 is a modification of the circuit of FIG. 2 replacing a fixed AC voltage source with a variable frequency voltage source.
Figure 5:
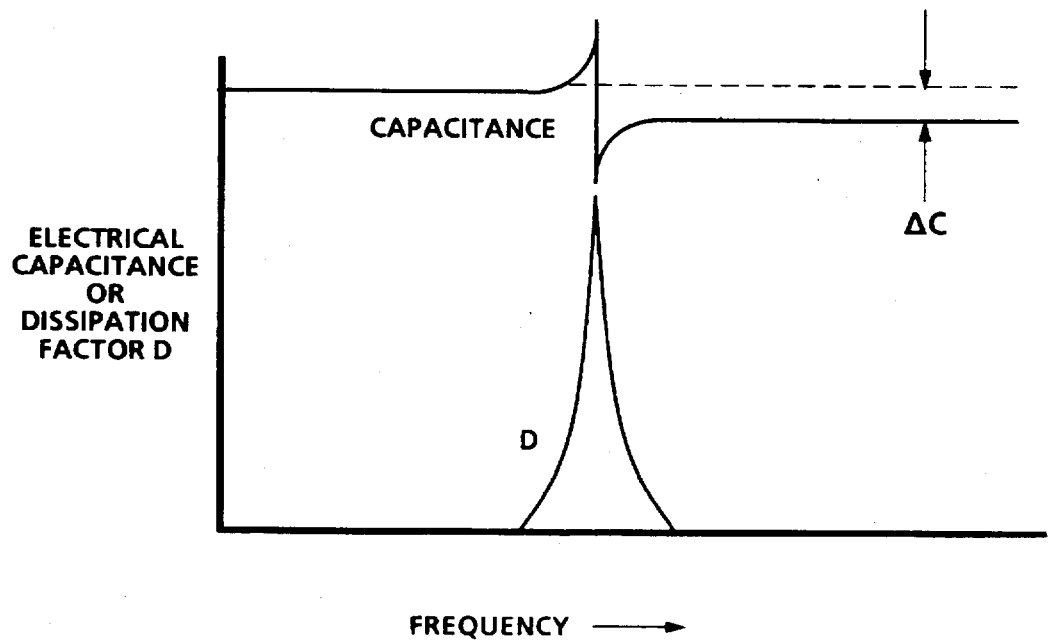
FIG. 5 is a plot obtained by plotting electrical capacitance versus frequency for the FIG. 4 embodiment.

According to a second embodiment of the invention, instead of a fixed AC voltage applied across the capacitor plates, a voltage controlled oscillator (VCO) 22'as shown in FIG. 4 applies the AC voltage across plates 8A, 8B. The circuit 24 operates in the same fashion as described above in connection with the FIG. 2 embodiment. At selected times, an embedded processor in controller 20 sweeps over the frequency range of voltage controlled oscillator 22' in a selected frequency range. The two outputs from phase detector 30 are then proportional to the reactance and dissipation of the ink. A simple algorithm in the processor extracts the information shown in the plots of FIG. 5. These plots result from plotting electrical capacitance or dissipation factor D against frequency.

In a second example, for this FIG. 4 embodiment, plates 8A, 8B are again 2¼×2¼ inch aluminum plates epoxied to the interior walls of an ink jet cartridge for a Xerox 4004 printer. The plates were attached to a Hewlett Packard model 4194A impedance analyzer. The frequency was swept from 1 to 40 MHz. A definite resonance peak in the D is seen (D is dissipation factor, which is readily computed from the in-phase and quadrature components by standard formulas). Similarly, the measured capacitance has a resonant behavior as shown, typical of a Maxwell-Wagner dissipation curve.

Four numbers are readily derived from a single sweep. They are (1) the capacitance below resonance, (2) the capacitance above resonance giving $\Delta C$ the difference between the capacitance above and below resonance, (3) the frequency of the resonance, and (4) the height of the D resonance curve. Several inks were tried and different resonant frequencies were observed between 4 and 28 MHz depending upon the ink. If pure water is inserted in the test cell, no resonance occurs in this frequency range.

Although the resonant frequency is an indicator of the type of ink, it has been found that some shift of resonance occurs with the amount of ink present. This is due to the fact that both the molecular compliance as well as the capacitance of the molecules not contributing to the resonance contribute to the effective capacitance of the resonance. The moment of inertia of the molecules contributing to the resonance determines the effective inductance at resonance and would not have a corresponding shift. However, this capacitive but not inductive error may be corrected for by measuring the capacitance and calculating the resonant frequency unperturbed by the amount of ink. This is a standard procedure in dielectric measurements.

In any case, the uniqueness of the set of four numbers is assured since it would be highly improbable that two inks would have these four numbers in common. Optionally, special additives to the ink may be incorporated, for example to enhance the resonance effects or shift the peak to a desired frequency.

While the embodiment disclosed herein is preferred it will be appreciated from this teaching that various alternative modifications, variations or improvements therein may be made by those skilled in the art which are intended to be encompassed by the following claims:

What is claimed is:

1. A system for detecting a level of ink contained within an ink supply tank supplying ink to a printhead, comprising in combination:

a capacitor, including capacitor plates positioned on both sides of the ink in said ink supply tank, the ink forming a dielectric of the capacitor, an alternating voltage signal applied across said capacitor plates and an electrical circuit connected to said capacitor, said circuit generating an output signal representative of said level of ink, said circuit including:

a resistive member connected between said capacitor and ground, said resistive member having a voltage across said member proportional to a current flowing through the capacitor plate and out of phase with said voltage, by 90°, said voltage varying as a function of the level of ink in said tank, phase detecting means for receiving as inputs, a signal derived from said applied alternating voltage signal and an output of said resistive member, and for generating as outputs a DC voltage proportional to an amplitude of the current in-phase with the applied voltage and a quadrature DC voltage proportional to the amplitude of the current 90° out of phase with the applied voltage, A/D conversion means for converting the output of said phase detecting means into a digital signal representing level of ink in said tank and means for converting said digital signal into a low ink level indication.

2. A system for detecting a level of ink contained within an ink supply tank supplying ink to a printhead, comprising in combination:

a capacitor, including capacitor plates positioned on both sides of ink in said ink supply tank, the ink forming a dielectric of the capacitor, a voltage controlled oscillator having a selected frequency range applied across said capacitor plates and an electrical circuit connected to said capacitor, said circuit generating an output signal representative of said level of ink, said circuit including:

a resistive member having a voltage across said member proportional to a current flowing through the capacitor plate and out of phase with said voltage, by 90°, said voltage varying as a function of the level of ink in said tank, phase detecting means for receiving as inputs a signal derived from said voltage controlled oscillator and an output of said resistive member, and for generating as outputs a DC voltage proportional to an amplitude of the current in-phase with the applied voltage and a quadrature DC voltage proportional to the amplitude of the current 90° out of phase with the applied voltage, A/D conversion means for converting the output of said phase detecting means into a digital signal representing the level of ink in said tank, and means for converting said digital signal into a low ink level indication.

3. The system of claim 4 wherein said changes during each sweep include capacitance below resonance, capacitance above resonance, a difference ΔC between capacitance above resonance and capacitance below resonance, and the frequency of the resonance.

4. The system of claim 2 further including means for sweeping over said frequency range while measuring changes in the reactance and dissipation of the ink and means for converting said changes to identify ink types of a specific dielectric constant.

5. A method for detecting a volume of ink in an ink tank comprising the steps of:

forming a capacitor by positioning plates on opposite sides of said ink, the ink forming a dielectric material between the plates, applying an AC voltage across said capacitor, connecting a resistive load in series with said capacitor, generating a first output voltage signal proportional to an amplitude of a current in-phase with the applied AC voltage.

generating a second output voltage proportional to an amplitude of the current 90 degrees out of phase with the applied voltage, converting the first output voltage and the second output voltage into a digital output, comparing the digital output to predetermined reference levels stored in a system processor, said reference levels providing points on a curve representing ink volume relative to ink electrical capacitance and generating a low ink level signal when a particular point on said curve is identified.

6. The method of claim 5 including the further step of storing in said processor calibration information corresponding to characteristics of a specific ink.

7. The method of claim 6 wherein said calibration information is stored on the printhead which is supplied with ink from said ink tank.

* * * * *